United States Patent
Jackson (10) Patent No.: US 10,179,402 B2
(45) Date of Patent: Jan. 15, 2019

(54) TOOL CADY WITH INCREMENTALLY DRIVABLE RATCHET CLAMPING AND TIGHTENING MECHANISM

(71) Applicant: Judd Jackson, Grant, MN (US)

(72) Inventor: Judd Jackson, Grant, MN (US)

( * ) Notice: Subject to any disclaimer, the term of this patent is extended or adjusted under 35 U.S.C. 154(b) by 0 days.

(21) Appl. No.: 15/942,194

(22) Filed: Mar. 30, 2018

(65) Prior Publication Data
US 2018/0222034 A1   Aug. 9, 2018

Related U.S. Application Data

(63) Continuation of application No. 13/458,038, filed on Apr. 27, 2012.

(60) Provisional application No. 61/479,900, filed on Apr. 28, 2011.

(51) Int. Cl.
| | |
|---|---|
| A45F 5/00 | (2006.01) |
| B25H 3/02 | (2006.01) |
| F16B 2/18 | (2006.01) |
| F16B 2/08 | (2006.01) |
| B25H 3/04 | (2006.01) |

(52) U.S. Cl.
CPC ............ *B25H 3/02* (2013.01); *B25H 3/04* (2013.01); *F16B 2/08* (2013.01); *F16B 2/185* (2013.01)

(58) Field of Classification Search
CPC ..... A45F 5/021; Y10S 224/904; Y10S 224/93
USPC ......... 248/230.1, 230.8, 74.2, 74.3; 224/660, 224/664, 665
See application file for complete search history.

(56) References Cited

U.S. PATENT DOCUMENTS

| | | | | |
|---|---|---|---|---|
| 5,588,186 A | * | 12/1996 | Ko | A44B 11/14 24/170 |
| 6,701,534 B2 | * | 3/2004 | Guibord | A41F 9/002 2/338 |
| 6,848,605 B2 | * | 2/2005 | Dillenberger | A45F 5/02 224/242 |
| 7,017,237 B2 | * | 3/2006 | Magno, Jr. | F16L 3/2334 24/16 PB |
| 2005/0242144 A1 | * | 11/2005 | Panosian | A45F 5/02 224/665 |
| 2007/0235607 A1 | * | 10/2007 | Liaw | F21V 21/088 248/218.4 |
| 2007/0241159 A1 | * | 10/2007 | Chang | A45F 5/02 224/677 |
| 2009/0039129 A1 | * | 2/2009 | Peterson-Malesci | A45F 5/02 224/682 |
| 2012/0024927 A1 | * | 2/2012 | LaFontaine | A45F 5/021 224/682 |

* cited by examiner

*Primary Examiner* — Steven M Marsh
(74) *Attorney, Agent, or Firm* — Sherrill Law Office, PLLC (57) ABSTRACT

A tool caddy that includes a laterally elongated band and a plurality of differently configured tool holders releasably attachable to the band. The band includes a plurality of laterally spaced attachment mechanisms along one end portion of the band, a toothed rack along the other end portion and a driveable pawl mechanism proximate the end of the band opposite the rack. The pawl mechanism provides a pivotable lever for driving the rack forward past the pawl in order to tension the band onto an object. The tool holders are releasably and selectively attachable to the attachment mechanisms.

10 Claims, 9 Drawing Sheets

TOOL CADY WITH INCREMENTALLY DRIVABLE RATCHET CLAMPING AND TIGHTENING MECHANISM

BACKGROUND

A common problem encountered by those who work with hand tools, especially when the hand tools are used infrequently, is the inability to locate the hand tools the next time they are needed. In an effort to minimize this frustration, many people use tool boxes to hold their tools in an effort to provide a fixed and established home for their tools. While somewhat effect for reducing the time and frustration involved in locating misplaced tools, tool boxes are not ideal as they conceal the tools, and can themselves often become hidden or misplaced.

Another option is to employ wall mounted tool display boards which allow ready visual identification of the tools mounted thereon, and are always found at the same exact location every time. The drawback with wall mounted display boards is the inability to quickly and easily allow a group of tools to be transported to a job site.

Hence, a longstanding need exists for a device capable of providing a fixed and established home for a given set of tools, displays the tools for ready visual location and identification, and allows the set of tools to be quickly and easily transported as a group to a job site.

SUMMARY OF THE INVENTION

A first aspect of the invention is a tool caddy. The tool caddy includes a laterally elongated band with a plurality of attachment mechanisms, a tightenable clamp and a plurality of differently configured tool holders. The band is sized, configured and arranged to encircle a cylindrical object. The plurality of attachment mechanisms are laterally spaced along the band. The clamp is effective for releasable compression fitting of the band onto the exterior sidewall surface of any one of a plurality of cylindrical objects of different diameters. The tool holders are releasably and selectively attachable to any of the plurality of attachment mechanisms.

A second aspect of the invention is a cable tie tensioning device useful for tensioning the tool caddy of the first aspect of the invention onto an object such as a tank. The tensioning device includes a reciprocating lever integrated with a pawl wherein the lever is operable for contacting and driving at least one tooth on a rack a distance forward towards the pawl sufficient to move at least one other tooth on the rack forward past the pawl each time the lever is reciprocated. Repeated reciprocation of the lever effects a tensioning of the rack around an object while the pawl prevents the rack from being pulled backwards by the tensioned rack.

DETAILED DESCRIPTION OF A PREFERRED EMBODIMENT

Figure 1:
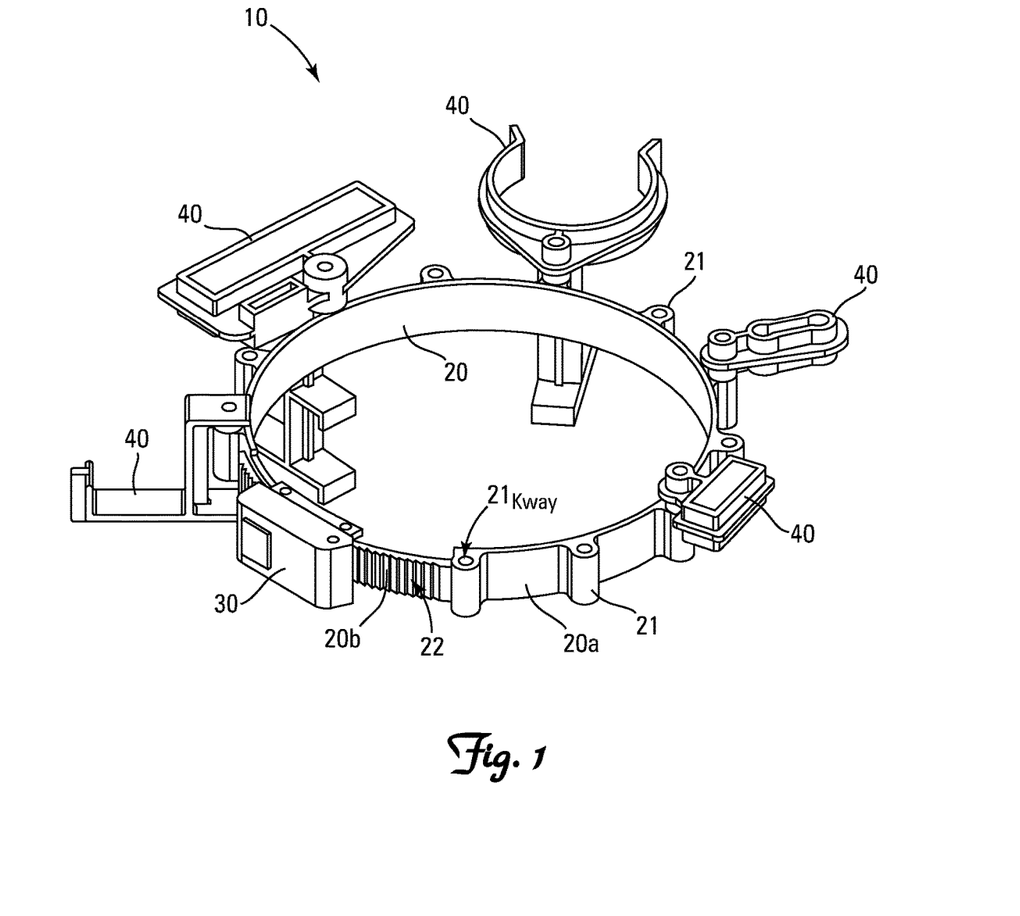
FIG. 1 is a perspective view of one embodiment of the present invention.

Nomenclature
10 Tool Caddy
20 Band
20a First Attachment Portion of Band
20b Second Rack Portion of Band
21 Attachment Mechanism
$21_{Kway}$ Keyway on Attachment Mechanism
22 Teeth on Rack Portion of Band
30 Tensioning Tool
31 Base
32 Lever
32a Leading Edge of Lever
32p Lever Pivot Axis
33 Pawl
33a Leading Edge of Pawl
33p Pawl Pivot Axis
34 Spring
39 Slot in Base
40 Tool Holder
$40_{Kway}$ Keyway on Tool Holder
$40_{Key}$ Key
y Lateral Axis of Band
A Object
E Tools or Equipment Construction One embodiment of the tool caddy 10 is depicted in FIG. 1.

Figure 2A:
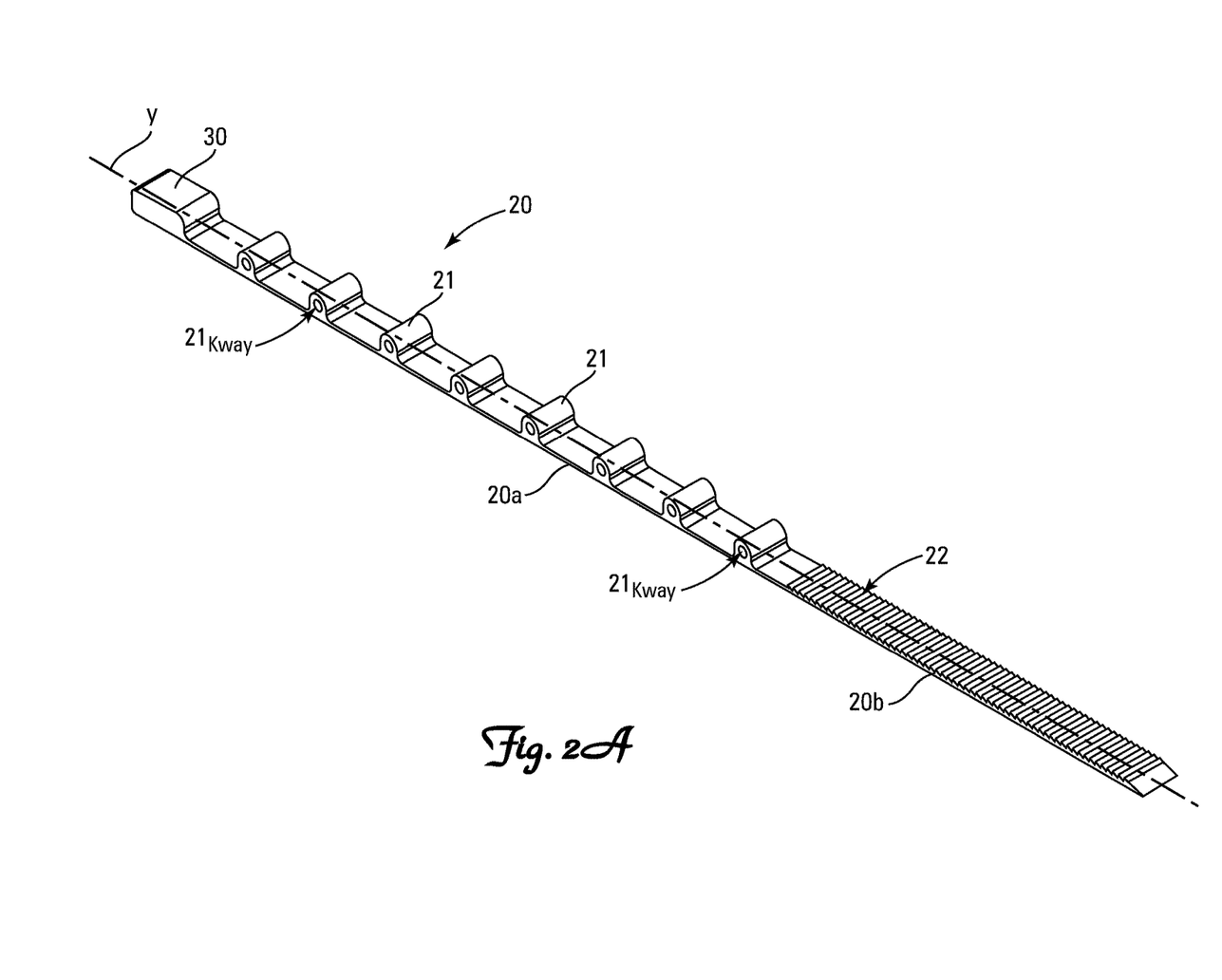
FIG. 2A is a perspective view of the band component of the invention depicted in FIG. 1 with a generic depiction of the pawl.
Figure 2B:
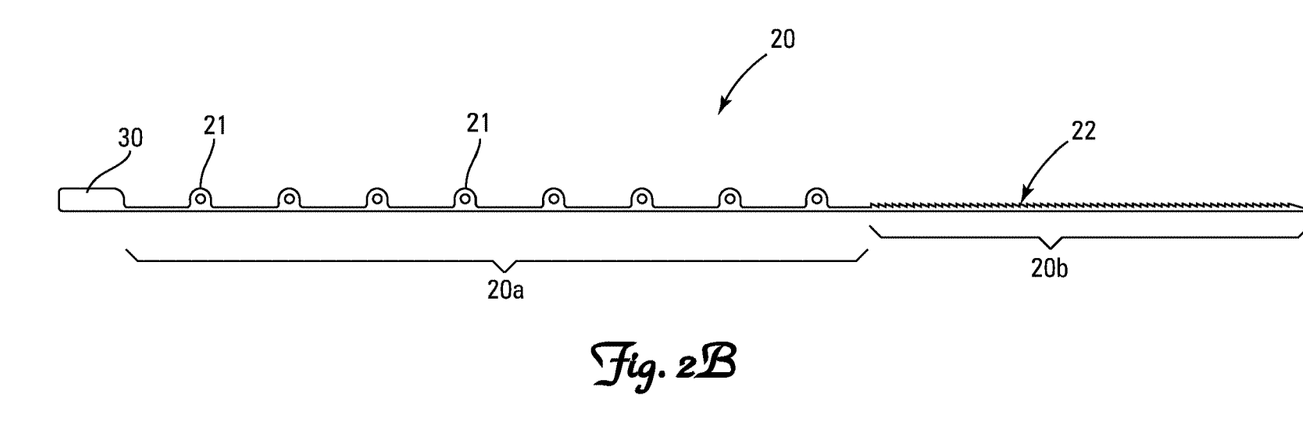
FIG. 2B is a side view of the band depicted in FIG. 2A.

Referring to FIGS. 1, 2A and 2B, the tool caddy 10 includes a laterally y elongated band 20 having a first portion 20a proximate a first end equipped with a plurality of laterally y spaced attachment mechanisms 21, and a second portion 20b proximate a second end forming a rack having a plurality of laterally y spaced angled teeth 22. Both the attachment mechanisms 21 and the teeth 22 project from a first or outward facing major surface (not numbered) of the band 20. The second or inward facing major surface (not numbered) of the band 20 may be covered with a non-slip material (not shown) such as a foamed rubber strip to inhibit slippage of the tool caddy 10 during use.

The band 20 preferably has a lateral y length of between one and five feet, most preferably between two and four feet, although shorter and longer lengths are possible. The second portion 20b of the band 20 preferably has a lateral y length of at least three inches up to 50% of the total longitudinal y length of the band 20, with a most preferred length of at least six inches up to 30% of the total longitudinal y length of the band 20. The band 20 is preferably manufactured from a strong, flexible, inelastic material such as polyethylene or polypropylene.

Figure 4A:
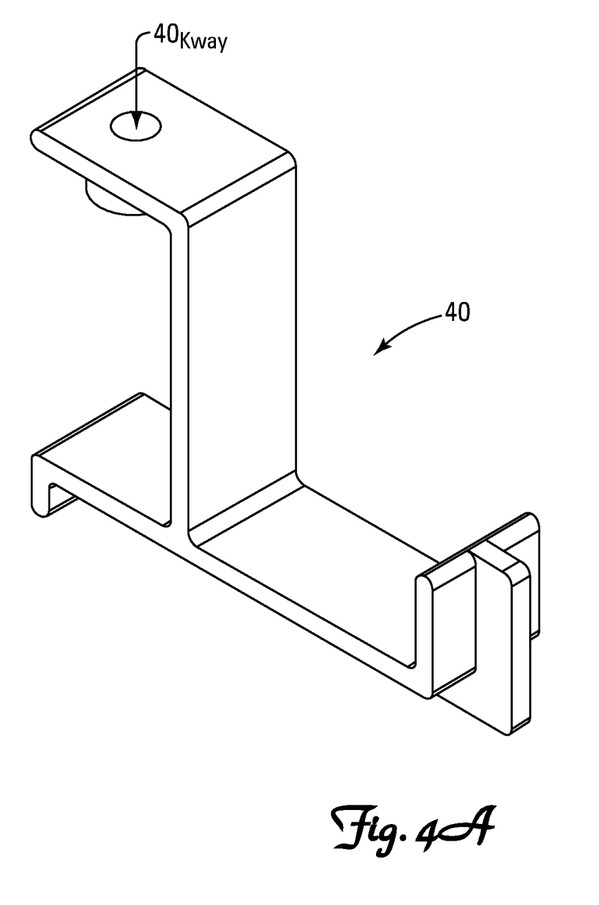
FIG. 4A is a perspective view of one type of a tool holder component of the present invention equipped with a keyway.
Figure 4B:
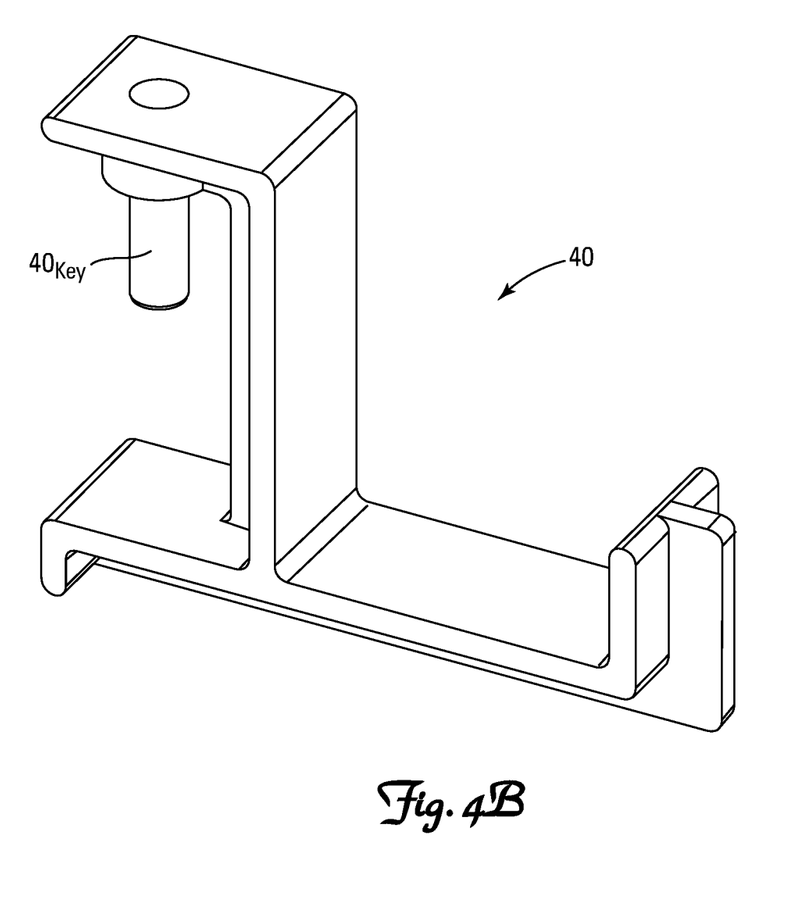
FIG. 4B is a perspective view of the tool holder component depicted in FIG. 4A fitted with a key.

The attachment mechanisms 21 on the first portion 20a of the band 20 are configured and arranged to releasably and selectively attach to and hold any one of a plurality of differently configured tool holders 40. In a preferred embodiment, the attachment mechanisms 21 and tool holders 40 are equipped with mating keys and keyways. One example of such a key and keyway combination is depicted in FIGS. 2A, 2B and 4B, wherein both the attachment mechanisms 21 and the tool holders 40 are provided with longitudinal borehole keyways $21_{Kway}$ and $40_{Kway}$ respectively. A pin key $40_{Key}$, sized for slideable engagement within the borehole keyways $21_{Kway}$ and $40_{Kway}$ is attached to and carried on the tool holders 40. The pin key $40_{Key}$ is effective for mounting each tool holder 40 onto an attachment mechanism 21. The pin keys $40_{Key}$ can be releasably or permanently attached within one of the borehole keyways $21_{Kway}$ or $40_{Kway}$. Any of the other well known releasable key and keyway attachment mechanisms can be employed.

The attachment mechanisms 21 on the first portion 20a of the band 20 are preferably uniformly spaced from one another a distance of between about one and about four inches, with a preferred distance of between two and three inches. A spacing of less than about one inch increases cost and decreases flexibility with little advantage, while a spacing of greater than about four inches often results in a waste of useable space for mounting tools and equipment E onto the tool caddy 10.

Figure 3A:
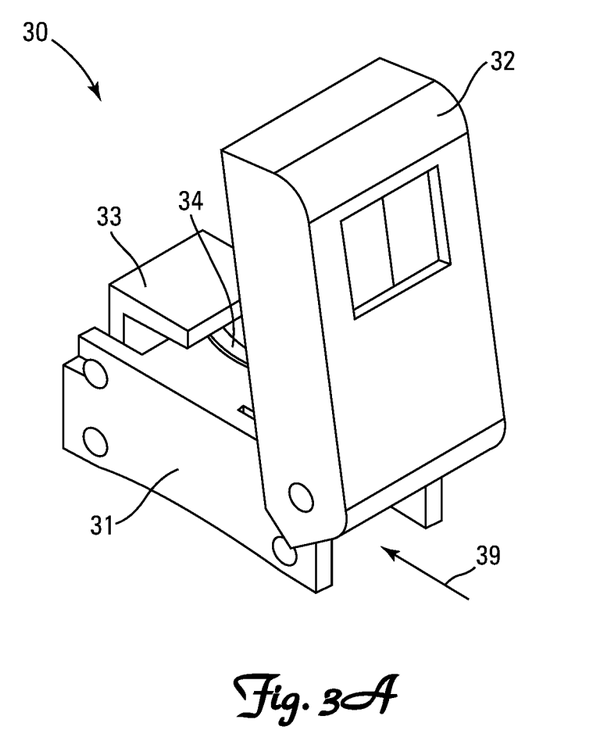
FIG. 3A is a perspective view of the drivable pawl depicted in FIG. 1.
Figure 3B:
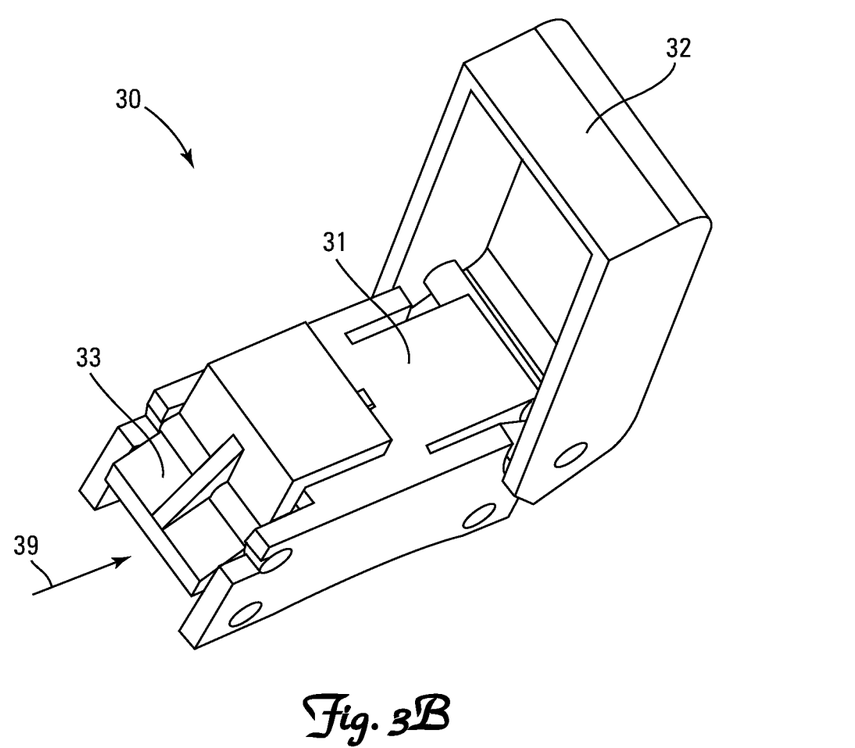
FIG. 3B is another perspective view of the drivable pawl depicted in FIG. 1.
Figure 3C:
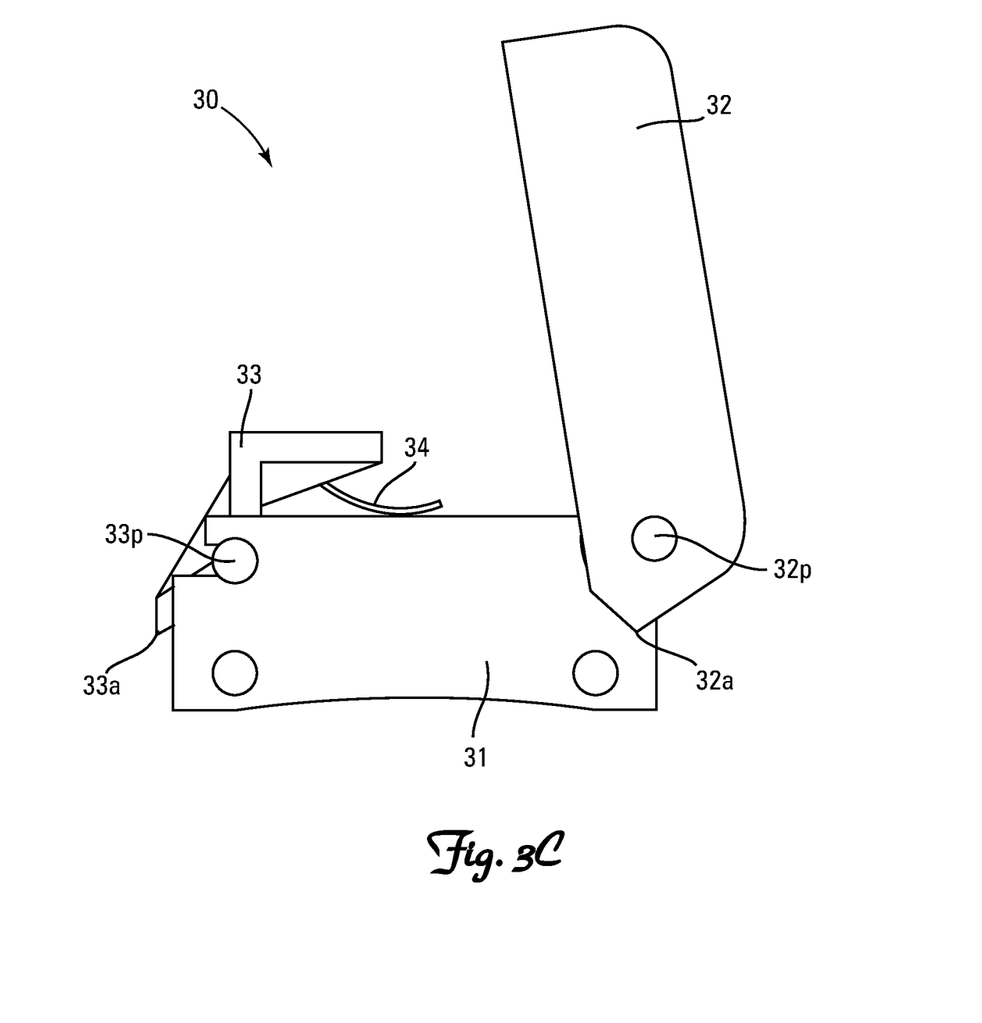
FIG. 3C is a side view of the drivable pawl depicted in FIGS. 3A and 3B.
Figure 5:
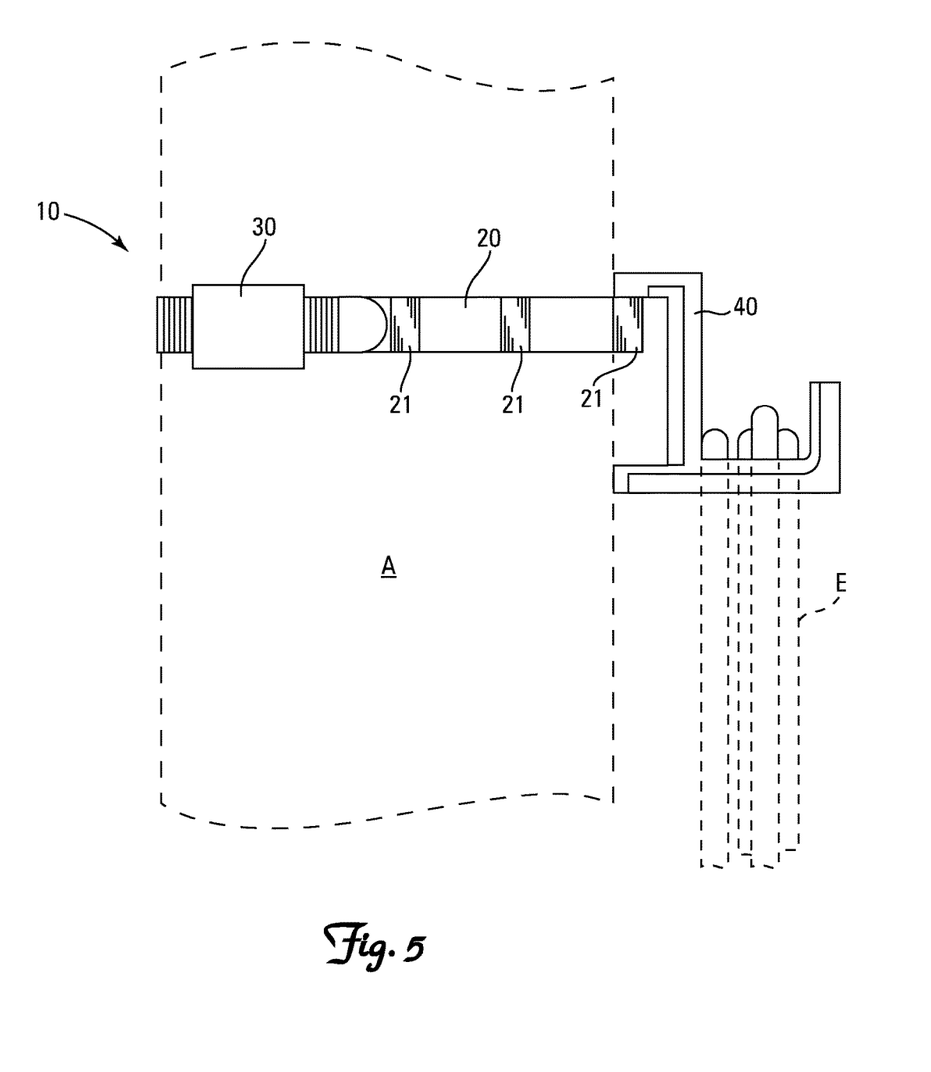
FIG. 5 is a side view of the band depicted in FIG. 2A compression fitted onto a welding gas cylinder with the tool holder depicted in FIGS. 4A and 4B attached to the band and holding a piece of welding equipment.

Referring to FIGS. 1, 2A and 2B, a tensioning tool 30 is attached to the lateral y end of the band 20 opposite the second rack portion 20b of the band 20. Referring to FIGS. 1 and 5, the tensioning tool 30 is effective for holding the lateral y ends of the band 20 together to form a loop, and assist in tensioning the band 20 around an object A such as a welding tank. FIGS. 3A, 3B and 3C depict a preferred tensioning tool 30. The tensioning tool 30 has a base 31 affixed to a lateral y end of the band 20 with a slot 39 for accommodating lateral passage of the second rack portion 20b of the band 20 through the base 31 and into operable engagement with a lever 32 and a pawl 33 on the base 31. The lever 32 and pawl 33 each pivot about laterally y spaced longitudinal pivot axies 32p and 33p respectively on the base 31. The lever 32 is configured and arranged so that a leading edge 32a of the lever 32 will engage a tooth 22 on the rack portion 20b of the band 20 and drive the band 20 forward towards the pawl 33 a distance sufficient to move at least one tooth 22 on the rack portion 20b of the band 20 forward past the pawl 33 each time the lever 32 is reciprocated. The pawl 33 is biased into engagement with the teeth 22 on the band 20 by a spring 34, such as a leaf or compression spring. The pawl 33 is configured and arranged to cooperate with the angled teeth 22 on the rack so that the teeth 22 on the rack portion 20b of the band 20 may readily move past the pawl 33 in the forward direction, but are prevented from moving backward past the pawl 33. This allows the band 20 to be tightly tensioned onto an object A.

The lever 32 preferably has a lateral y length of between about one and two inches. A lateral y length of less than about one inch limits the leverage force that can be applied for driving the rack forward, while a lateral y length of greater than about two inches increases cost with little concomitant benefit.

A tensioned band 20 may be released and removed from an object A by pivoting the pawl 33 against the bias of the spring 34 to lift the leading edge 33a of the pawl 33 away from the teeth 22, thereby allowing the second rack portion 20b of the band 20 to freely slide backwards past the pawl 33.

The tool holders 40 can be configured and arranged as desired to hold a wide variety of tools and equipment E. Several exemplary tool holders 40 are depicted in FIG. 1. The configurations that could be employed are virtually endless.

I claim:
1. A tool for tensioning a cable tie having a longitudinally extending rack with angled teeth and a pawl, the tool comprising a reciprocating lever integrated with the pawl, the lever operable for pivoting about an axis in a clockwise and a counterclockwise direction so as to contact and drive at least one tooth on the rack a distance forward towards the pawl in a first longitudinal direction sufficient to move at least one other tooth on the rack forward in the first longitudinal direction past the pawl each time the lever is pivoted in the clockwise direction, and the pawl operable for engaging at least one of the at least one other tooth on the rack driven forward in the first longitudinal direction past the pawl so as to prevent that engaged at least one other tooth from being pulled backwards in a second longitudinal direction opposite the first longitudinal direction by tension on the rack during pivoting of the lever in the counter clockwise direction.

2. A tool caddy, comprising:
    (a) a laterally elongated band configured and arranged to encircle a cylindrical object,
    (b) a plurality of attachment mechanisms laterally spaced along the band,
    (c) a tightenable clamp comprising a tensioning tool according to claim 1, the clamp effective for selective releasable compression fitting of the band onto an exterior sidewall surface of any one of a plurality of incompressible cylindrical objects of different diameters at a compression force effective for self-support of the tool caddy and a plurality of tools supported by the tool caddy on an incompressible cylindrical object, and
    (d) a plurality of differently configured tool holders releasably and selectively attachable to any of the plurality of attachment mechanisms.

3. The tool caddy of claim 2 wherein the band is between one and five feet long and formed of an inelastic material.

4. The tool caddy of claim 2 wherein the attachment mechanisms are keyways configured and arranged to retentively accept a key on each tool holder.

5. The tool caddy of claim 2 wherein the attachment mechanisms are keys configured and arranged to retentively fit within a keyway on each tool holder.

6. The tool caddy of claim 2 wherein the tightenable clamp is a ratchet.

7. The tool of claim 1 wherein the lever pivotably reciprocates about a lateral axis.

8. The tool of claim 1 wherein the lever is between 1 and 2 inches long.

9. The tool of claim 1 wherein the lever and pawl are each pivotably coupled to a common base.

10. The tool of claim 1 wherein the base has a slot configured and arranged to accommodate sequential passage of a rack past the lever and the pawl.

* * * * *